United States Patent [19]

Rana et al.

[11] 4,128,163
[45] Dec. 5, 1978

[54] CART CONVEYOR SYSTEM

[75] Inventors: Victor F. Rana, Merrimack; Paul D. Siniscal, Hollis, both of N.H.

[73] Assignee: Rockwell International Corporation, Pittsburgh, Pa.

[21] Appl. No.: 786,645

[22] Filed: Apr. 11, 1977

[51] Int. Cl.² .............................................. B65G 17/00
[52] U.S. Cl. ..................................... 198/796; 198/482; 198/484; 198/705
[58] Field of Search ............... 198/362, 365, 366, 370, 198/372, 424, 476, 482, 484, 769, 705, 793, 796, 782, 710, 712, 713; 214/11 R, 6 DK, 42 R, 43, 58, 59 R, 60; 104/88, 245, 246; 105/238 R, 355; 280/408; 271/192, 189

[56] References Cited

U.S. PATENT DOCUMENTS

| 712,585 | 11/1902 | Peck | 198/710 |
| 3,231,068 | 1/1966 | Harrison et al. | 198/365 |
| 3,361,247 | 1/1968 | Lavzon et al. | 198/370 |
| 3,451,525 | 6/1969 | Greller | 214/11 R |
| 3,540,380 | 11/1970 | Tumpak et al. | 104/246 |
| 3,604,319 | 9/1971 | Hirahara | 198/484 |
| 3,815,723 | 6/1974 | Wright et al. | 198/357 |
| 3,848,725 | 11/1974 | Toby | 198/424 |
| 3,977,513 | 8/1976 | Rushforth | 198/365 |

FOREIGN PATENT DOCUMENTS

2037380 1/1972 Fed. Rep. of Germany ........... 198/365

Primary Examiner—Joseph E. Valenza

[57] ABSTRACT

A cart conveyor system for transporting bundles of newspapers from a bundle-forming region within a mail room to a loading dock includes a new cart construction which is elongated in a direction transverse to the direction of motion of the cart train, and a plurality of carts are pivotally connected end to end to form a continuous closed loop train of carts. Bundles are loaded into the cart from an overhead loading structure and the forward wall of the cart is tilted forwardly to allow the clearance of the bundle as it falls from above. The carts are then conveyed to an exit station, where a pusher blade, which pushes transversely across the width of the cart, is engaged by an overhead cam to eject parallel bundles from the cart and into a discharge chute when the cam is operated. The cart, rail and wheel construction is such that the cart is constrained to the conveyor rails. The cart platforms are provided with raised tracking surfaces to serve as a raised platform for slightly bulging newspaper stacks. The bundle entry device of the system is a novel overhead platform consisting of separable halves, each formed of transverse rollers.

4 Claims, 11 Drawing Figures

CART CONVEYOR SYSTEM

BACKGROUND OF THE INVENTION

This invention relates to a closed-loop cart conveyor, and more particularly relates to a novel closed-loop cart conveyor for a newspaper mail room and for conveying newspaper stacks from a stack-forming region to a loading dock.

Conveyor systems for newspaper mail rooms are well known in the art and systems are typically shown in U.S. Pat. No. 3,977,513, in the name of George T. Rushforth, assigned to the assignee of the present invention. Conveyor systems are also shown in U.S. Pat. Nos. 3,848,728 and 3,815,723. The conveyor arrangements of the prior art are relatively expensive, require complex entrance and exit devices for the bundles, have a limited loading and delivery speed, and are limited in the turn radius which can be used in the system and in the incline and decline angles of the track of the system.

BRIEF SUMMARY OF THE PRESENT INVENTION

The present invention is for a novel cart conveyor system which improves the conveyor in all of the respects mentioned above. More particularly and in accordance with the invention, an endless train of interconnected carts is provided wherein each cart rides on a novel track configuration and each cart has pairs of wheels located at one end of each cart. Thus, each cart is provided with two vertical wheels which carry the cart weight and which are constrained between upper and lower track surfaces to insure positive retention of the carts on the track even though the track may rise or fall in height. The cart is also provided with two horizontal wheels above the two vertical wheels, respectively, where the horizontal wheels cause lateral retention of the cart relative to the new conveyor track. The individual carts are connected to one another by a generally universal type connection which permits the cart train to travel around curves and to make changes in elevation as required by the geometry of the newspaper facility.

The entire cart train may then be propelled in any desired manner and, for example, may be propelled by a traction drive consisting of motor-driven belts which contact a short friction surface on the underside of each cart in the manner described in U.S. Pat. No. 3,977,513, which is incorporated herein by reference.

Entry stations are then provided to allow easy loading of the newspaper bundles in a lengthwise direction, that is, with the bundles elongated in a direction perpendicular to travel of the cart, from above the cart train path. Each cart is capable of receiving two such bundles, end to end. The entry station is also arranged to allow easy bypass of the loading station and the use of direct feed, if desired.

Each cart is then equipped with a novel bundle pusher arrangement which permits lateral discharge of the bundles in the cart as the cart train passes the discharge station. Selective positioning of the bundle pushers permit exit from either the right or left of the cart as permitted by the cart configuration.

A novel bundle entry device is also provided which has a platform consisting of two separable roller conveyors. These roller conveyors receive stacks to be loaded and, when the proper cart moves below the platform, the halves open and the stacks fall by gravity into the cart.

DETAILED DESCRIPTION OF THE DRAWINGS

Figure 1:
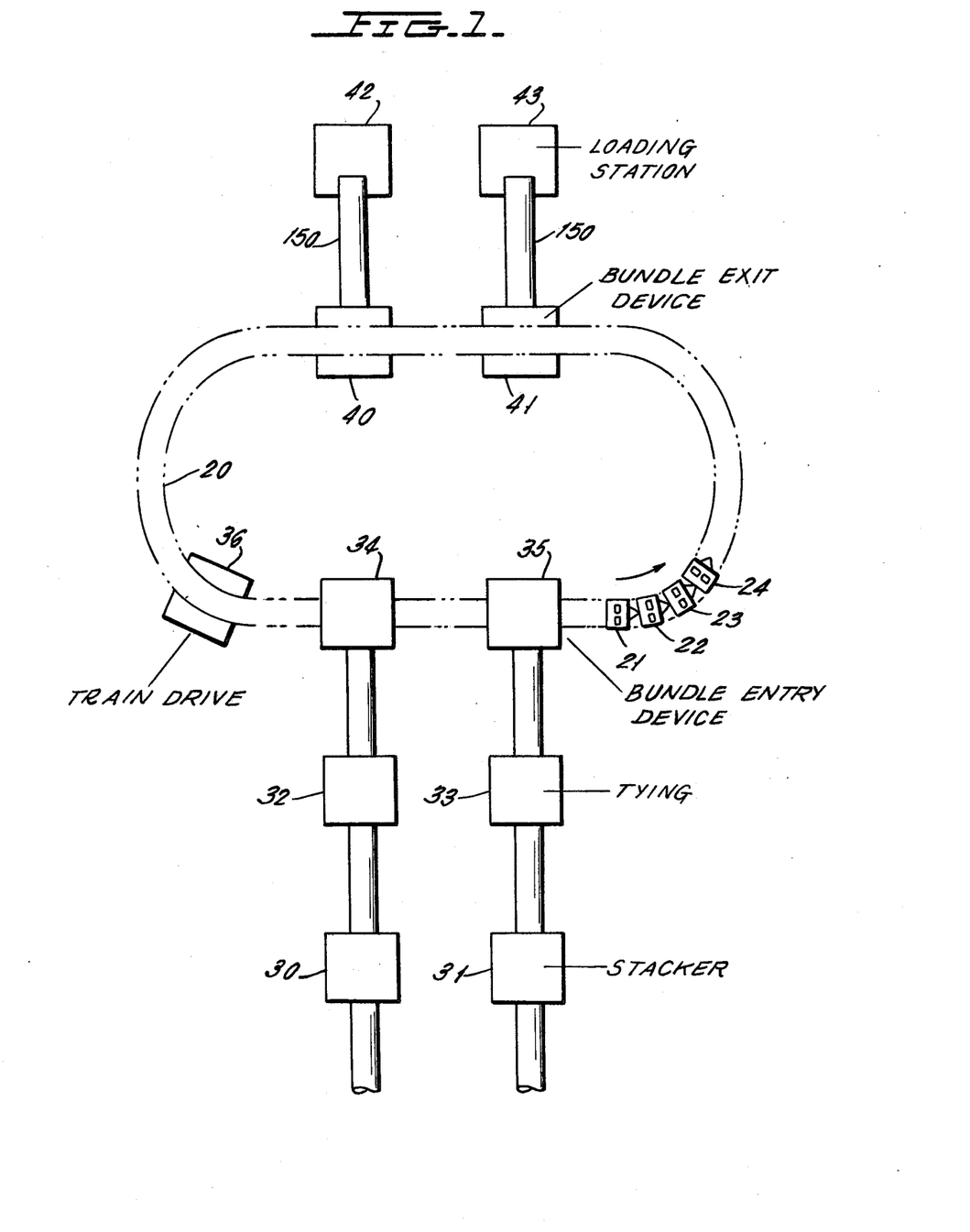
FIG. 1 is a schematic plan view of the conveyor system of the present invention.

Referring first to FIG. 1, there is schematically illustrated, in plan view, a simple conveyor system constructed in accordance with the invention, wherein a closed track 20 has thereon a continuous train of carts, such as carts 21, 22, 23 and 24 which are pivotally connected to one another and roll on the track 20. Bundles of newspapers are then formed by one or more stackers 30 and 31 and these bundles are conveyed to bundle tiers 32 and 33, respectively, and are then conveyed to the novel bundle entry devices 34 and 35 to be deposited into the individual carts, as will be later described. The entire cart train is then driven by a suitable train drive 36 so that the carts continuously travel around the track 20 and past bundle exit devices 40 and 41 to be delivered to loading stations 42 and 43, respectively, at a newspaper loading dock.

Numerous improvements have been made in the various components of the system as will now be described. First, the cart has been substantially improved, with an individual cart 21 shown in detail in FIGS. 2 and 3.

Figure 2:
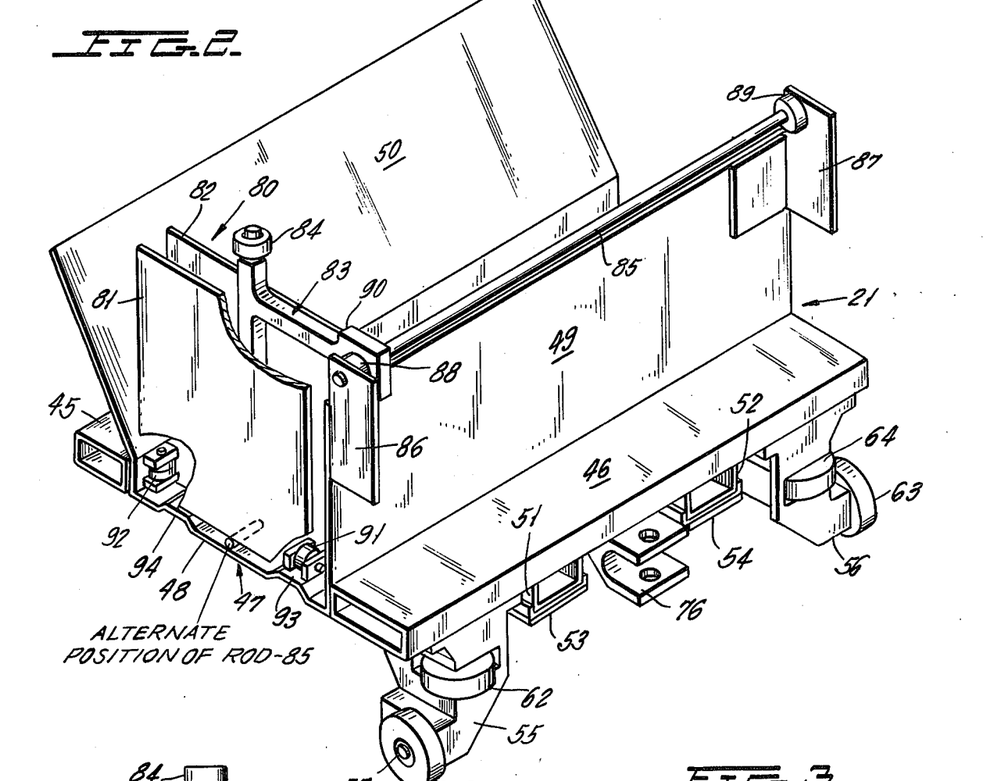
FIG. 2 is a perspective view of one of the carts of the invention which contains novel cart construction features.
Figure 3:
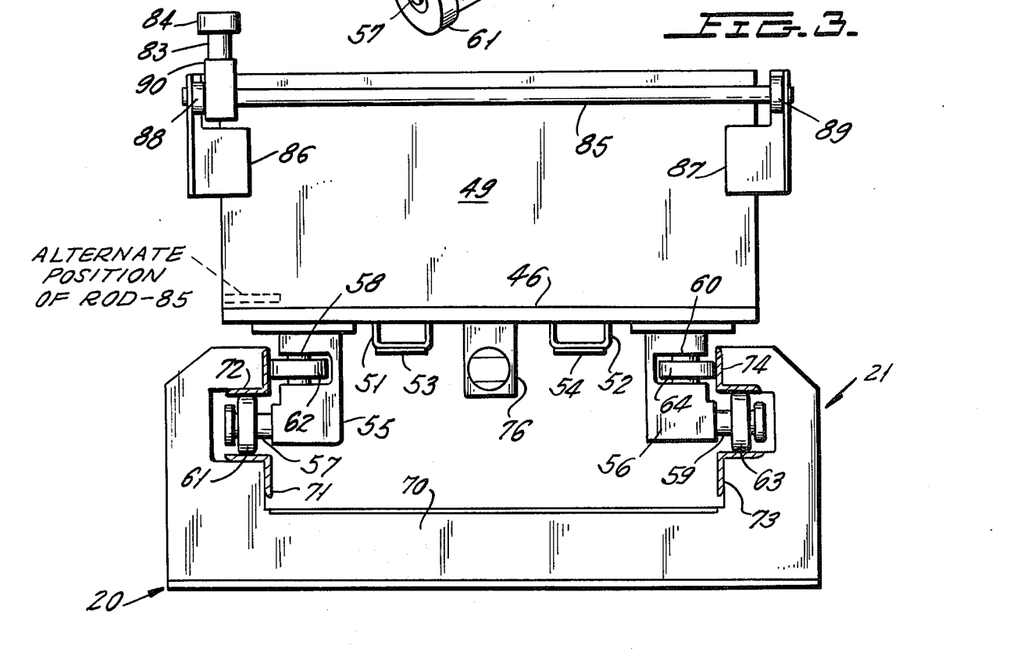
FIG. 3 is an elevation view of the cart of FIG. 2.

Referring to FIGS. 2 and 3, the cart 21 is a cart which moves in a direction transverse to its longest direction, and the cart is provided with a rigid frame which includes front tubular member 45 and rear tubular member 46. The front and rear members 45 and 46 are connected to the sheet metal, generally U-shaped body portion 47 which defines a bottom platform 48, a vertically upwardly extending rear wall 49 and a forwardly inclined leading wall 50. Bottom platform 48 may be about 34 inches wide and 13 to 14 inches long, and is adapted to receive two stacks of newspapers located end to end, with their longest dimension extending along the cart width and perpendicular to the path of movement of the cart.

Two channels 51 and 52 extend across the bottom of the cart and are secured to members 45 and 46. Channels 51 and 52 carry bottom friction belt surfaces 53 and 54, respectively, which may engage the continuous track of a driving belt of the type shown in U.S. Pat. No. 3,977,513, schematically shown as the train drive 36 in FIG. 1.

Each of the carts is then provided with rearwardly disposed wheel brackets 55 and 56, respectively, where each wheel bracket receives two perpendicular shafts including wheel shaft 57 and 58 for bracket 55 and axles 59 and 60 for bracket 56. Axles 57, 58, 59 and 60 then receive wheels 61, 62, 63 and 64, respectively.

FIG. 3 illustrates the manner in which wheels 61 to 64 are retained within the conveyor track 20. Thus, as shown in FIG. 3, the conveyor track is supported by generally U-shaped sheet metal support frames, such as the frame 70, where the track consists of a plurality of such spaced and parallel members extending around the cart path track. The frame 70 then serves to support elongated angle rails 71-72 on one side and 73-74 on the other side. Wheels 61 and 63 roll on rails 71 and 73, respectively, and are disposed beneath rails 72 and 74, respectively.

A slight clearance of from about ⅛ to 3/16ths inches is provided between wheels 61 and 63 and rails 73 and 74, respectively, to enable the rotation of wheels 61 and 63 as they roll on the lower rails 71 and 73, respectively. Note that the rails 71 and 73 are the main load-bearing rails, whereas the rails 72 and 74 primarily serve to keep the wheels 61 and 63 from leaving the surface of rails 72 and 73 when the cart track rises. Wheels 62 and 64 of the cart are adjacent to and will roll on the vertical inner surfaces of angles 72 and 74 in order to constrain the cart from lateral movement relative to the conveyor track 20.

Note that only one pair of rearwardly disposed wheels is provided for each cart, and that the cart is connected to an adjacent cart through a universal-type connection which also helps to support the cart end not provided with wheels. FIGS. 2 and 3 clearly illustrate the rear connector clamp member 76 which is suitably connected to channel 46. A cooperating universal connector, which can be suitably connected to clamp 76, is provided at a central location on the front of the cart connected to channel 45, not shown.

The cart 21 of FIGS. 2 and 3 is then provided with a bundle pusher plate 80 adapted to push bundles off the cart at the bundle exit devices 40 and 41, as will be later described. The pusher plate 80 is shown in FIGS. 2 and 3 as a double walled plate member which has oppositely disposed flat plate walls 81 and 82 (FIG. 2) which will allow the pushing of a bundle from right to left or from left to right depending upon the starting position of the pusher plate 80.

The pusher plate 80 then has a rigid L-shaped frame 83 sandwiched between plates 81 and 82 and rigidly connected thereto as by welding or the like. An upwardly projecting section of member 83 is provided with a rotatable cam follower wheel 84, which will later be seen to engage an actuating cam at the bundle exit device to cause the movement of the pusher plate 80 from right to left or from left to right.

The motion of plate 80 and of its frame 83 is guided on a stationary guide shaft 85 which is fixed to the vertical wall 49 by the angles 86 and 87 which are welded to wall 49. Note that suitable elastomeric stops 88 and 89 may be fixed to the ends of shaft 85. An outwardly extending arm 90 of member 83 then has a circular opening therein which receives the guide shaft 85, thus providing one degree of guiding for the motion of plate 80.

The plate 80 is further guided at its bottom by a bottom wheel 91 which is rotatably mounted within brackets fixed between plates 81 and 82 and by a side wheel 92 which is similarly fixed for rotation between brackets which are also fixed between plates 81 and 82. As shown in FIG. 2, the bottom wheel 91 then rolls on upwardly raised tracking surface 93 of the bottom platform 48 while the side wheel 92 rides along the bottom of the forwardly projecting front wall 50.

Thus, the pusher plate 80 is fully guided and restrained by means of the guide shaft 85 and roller wheels 92 and 93 for transverse motion across the width of the cart when the cam wheel 84 is actuated by a suitable camming mechanism in order to push bundles on the cart bottom off of the cart.

It will be noted that the cart bottom 48 is provided with a second raised section 94 which is similar to raised section 93. Bundles lying on the cart bottom will, in fact, engage the cart only on the tops of projections 93 and 94, thus allowing for easier sliding of the bundles along the bottom, even though the bundles may bulge outwardly in their centers. Thus, damage of the lower papers of a bundle is substantially reduced through the use of the upwardly projecting sections 93 and 94 which extend across the full width of the cart.

It will be noted in FIG. 2 that the wall 50 tilts forwardly and toward the direction of motion of the cart, whereas the rear wall 49 extends vertically upward and perpendicularly to the cart bottom. This novel arrangement allows an increase in the loading speed of the conveyor since the forwardly projecting wall 50 permits a bundle to be dropped toward the cart even though the cart platform which ultimately receives the bundle is not yet immediately beneath the bundle. The forward pitch of the wall is at an angle calculated such that the edge of the newspaper stack, as it falls, will always be spaced from the forwardly leading wall 50 by an approximate constant distance. It is noted, however, that the rear wall 49 extends vertically upward and that this wall is not pitched backward symmetrically with the wall 50. The vertical positioning of wall 49 permits the cart adjacent to wall 49 to be closer to the adjacent cart, thus permitting a greater number of carts in a given length of conveyor track.

If desired, wall 50 may be an articulated wall pivotally mounted to the platform 48 and arranged so that it can be raised to an erect position, perpendicular to the platform 48 after it is loaded with stacks of newspapers. This would allow the cart train to make sharper turns after cart loading since the adjacent walls of adjacent carts will have greater separation. This will also allow the cart to descend at a sharper angle without having the stacks tilting over the forward cart wall.

In FIGS. 2 and 3, the guide shaft 85 is disclosed as being disposed at the top of and outside of wall 49. If desired, this guide shaft 85 can be relocated as desired and, for example, could be disposed at the middle of the bottom of the pusher plate, as schematically indicated in dotted lines in FIGS. 2 and 3. Any suitable support for the rod 85 in this alternate position may be provided and a suitable sliding connection may be made to the rod from the member 83.

Figure 4:
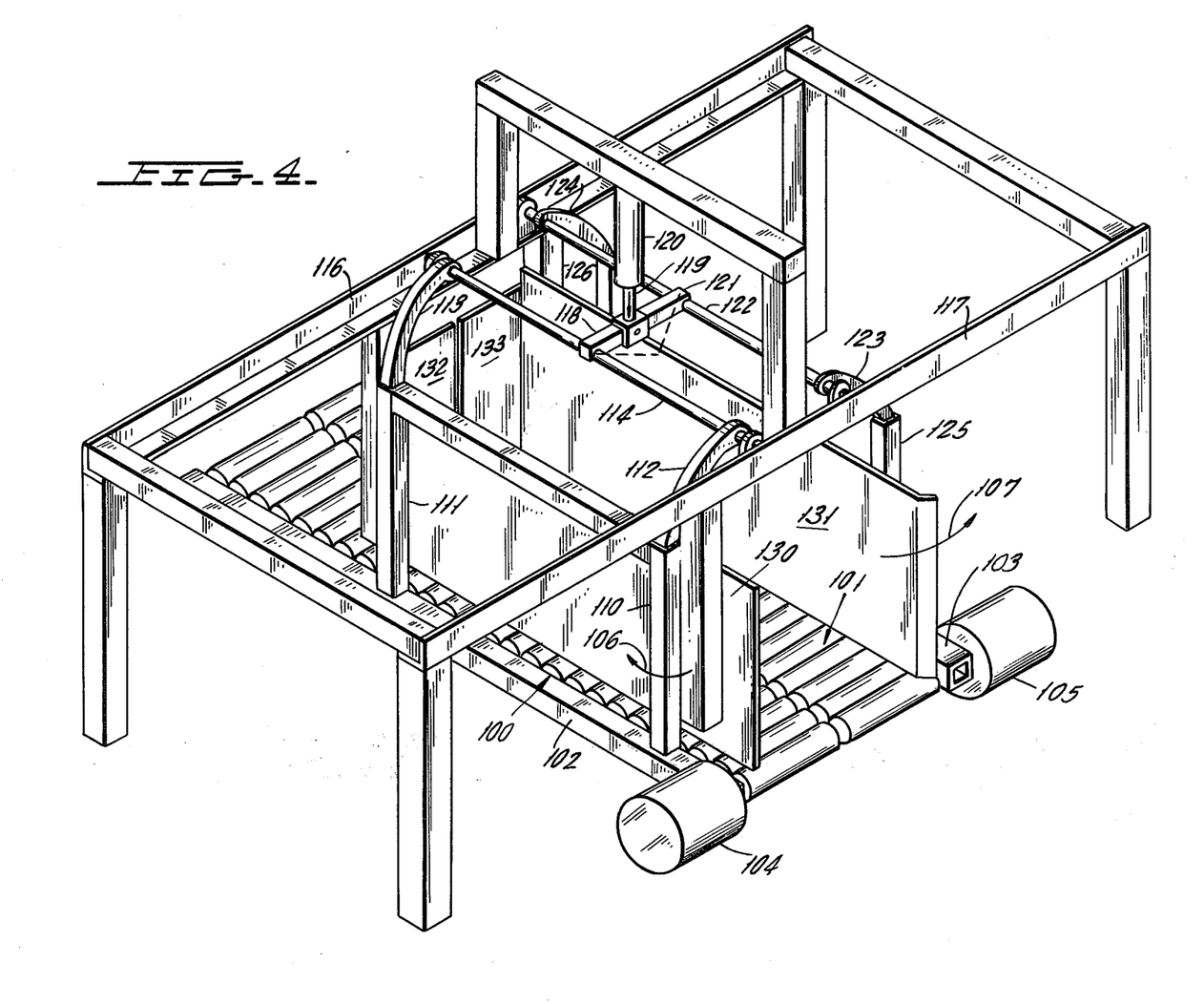
FIG. 4 is a perspective view of the bundle entry device without track or carts in position.
Figure 5:
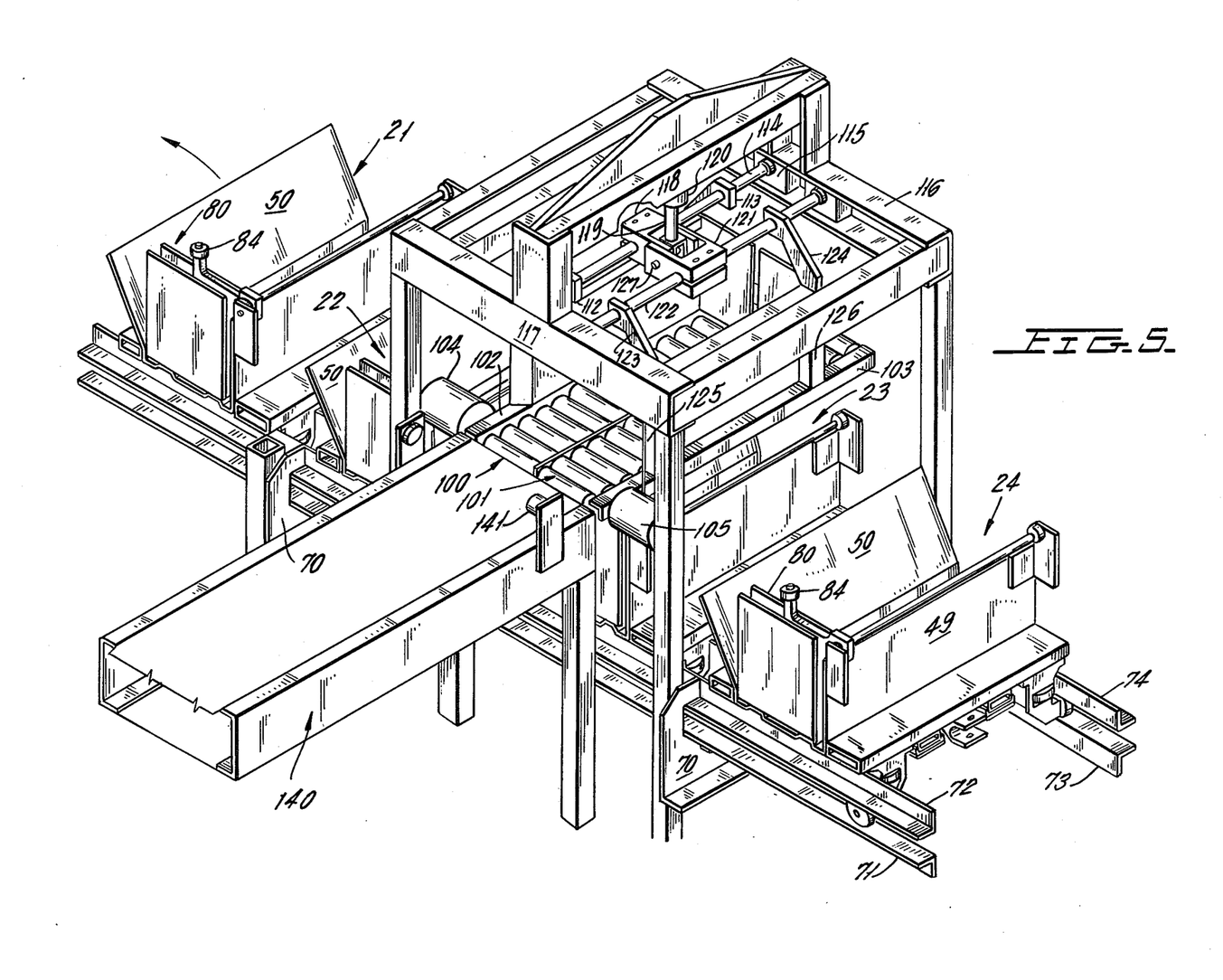
FIG. 5 is a different perspective view of the bundle entry device of FIG. 4 with the track in place and a cart train passing through the bundle entry device.

FIGS. 4 and 5 show the novel bundle entry device of the present invention, where FIG. 4 shows the entry device without the tracks or carts in position, while FIG. 5 illustrates four carts 21 through 24 located within the bundle entry device. Note that all of carts 21 to 24 will be identical in construction to the cart described in connection with FIGS. 2 and 3.

FIGS. 4 and 5 both show a support frame consisting of steel channels of conventional configuration which ultimately support two pairs of roller conveyors 100 and 101. The roller conveyors 100 and 101 each have side frame members 102 and 103, respectively, which pivotally mount each of their rollers in cantelevered, and parallel relationship, and each of the frames 102 and 103 contain a roller drive motor 104 and 105, respectively, for positively driving the rollers of their respective roller conveyor in the same direction.

In the position shown, the roller conveyors 100 and 101 define a single, flat platform for supporting newspaper or other bundles which straddle the line at the juncture between the two roller conveyors 100 and 101.

Each of the roller conveyors 100 and 101 are then pivotally mounted and can swing from the position illustrated to outward positions, where the roller conveyors swing away from one another in the direction of arrows 106 and 107 in FIG. 4 to create a large gap. Any newspaper stack supported by the roller conveyors 100 and 101 will then drop horizontally down and into a cart passing beneath the rollers.

The pivotal support arrangement for frame 102 includes frame legs 110 and 111 (FIG. 4) which are connected to bent bracket arms 112 and 113, respectively. The arms 112 and 113 are then connected to a pivotally mounted shaft 114 which is pivotally mounted within support blocks, best shown in FIG. 5, as the support block 115 in frame member 116 and a similar support block in frame member 117. Rotatable shaft 114 is then connected to crank arm 118 which is, in turn, pivotally connected to operating shaft 119 which is connected to an air cylinder 120. An identical connection is made from the shaft 119 of air cylinder 120 to the frame 103 of roller conveyor 101 including the mechanical connection of crank arm 121, shaft 122, generally curved links 123 and 124, which are fixed to shaft 122 and angles 125 and 126 connected to members 123 and 124, respectively, with the angles 125 and 126 connected to frame member 103.

In operation, when air cylinder 120 is operated so that it is moved downwardly, it will cause the downward motion of the free and abutting ends of cranks 120 and 121, which are pivotally connected by the pivot pin 127, thereby causing rotation of shafts 114 and 122 in opposite directions. The rotation of the shafts 114 and 122 causes the frames 102 and 103 to rotate about the axes of shafts 114 and 122, respectively, thereby causing the outward movement of roller conveyors 100 and 101. Any bundle or bundles on roller conveyors 100 and 101 will then drop, by gravity, into the cart train below. Clearly, any suitable operating mechanism can be used.

If desired, other exit devices could be used in the system in place of the pusher plate system. For example, exit of bundles from the carts could be obtained by providing a gate on the cart in the manner shown in U.S. Pat. No. 3,977,513 and tilting the carts at the exit region to cause the bundles to bear against the gate, and to slide off the cart due to gravity when the gate is opened.

FIG. 4 shows the provision of side guide plates 130 and 131 extending along roller conveyors 100 and 101, respectively, where the plates 130 and 131 are of the nature of pacer plates which can move into gripping engagement with bundles moving along the roller conveyor. FIG. 4 also illustrates the provision of doors 132 and 133 at the downstream side of the bundle entry device, which doors can open to permit bundles to pass through the bundle entry device if they are not to be loaded by the roller conveyors 100 and 101.

The loading of bundles into bundle entry device will be controlled by suitable control circuitry which determines when one bundle or two bundles are to be delivered by the bundle entry device, and to control the operation of roller device motors 104 and 105, so that the roller motion is stopped prior to the time that the assembly opens to allow the downward dropping of the bundles.

FIG. 5 further illustrates the provision of input loading chute 140 which can be a conveyor, or the like, for bringing bundles into the roller conveyors 100 and 101 and past a bundle sensor 141, which may be a photoelectric type device, which operates in connection with the control circuity for determining the loading of bundles into the bundle entry device and the discharge of bundles therefrom.

FIG. 5 further illustrates the support of the tracks 71 through 74 by two spacer supports 70 which are fixed to upwardly extending frame members which support the tracks 71 through 74 beneath the roller conveyors 100 and 101. FIG. 5 also shows carts 21 to 24 connected in train fashion and passing beneath roller conveyors 100 and 101, with their leading walls 50 projecting forwardly.

In operation, one or two stacks of newspapers are placed on the roller conveyors 100 and 101 side by side and aligned with their elongated direction perpendicular to the tracks 71 to 74. This enables entry of the bundles on the cart and exit from the cart without having to change bundle direction. As the upper edge of cart 50 passes below the roller conveyors 100 and 101, the cart edge is sensed by appropriate sensing means, so that, as the cart edge passes the forward edge of the bundles to be deposited into the cart, the roller conveyors are opened so that the newspaper bundles fall freely while the carts move forwardly and fall squarely on the bottom of the cart beneath the roller conveyors.

Figures 6A, 6B, 6C, 6D, 7:
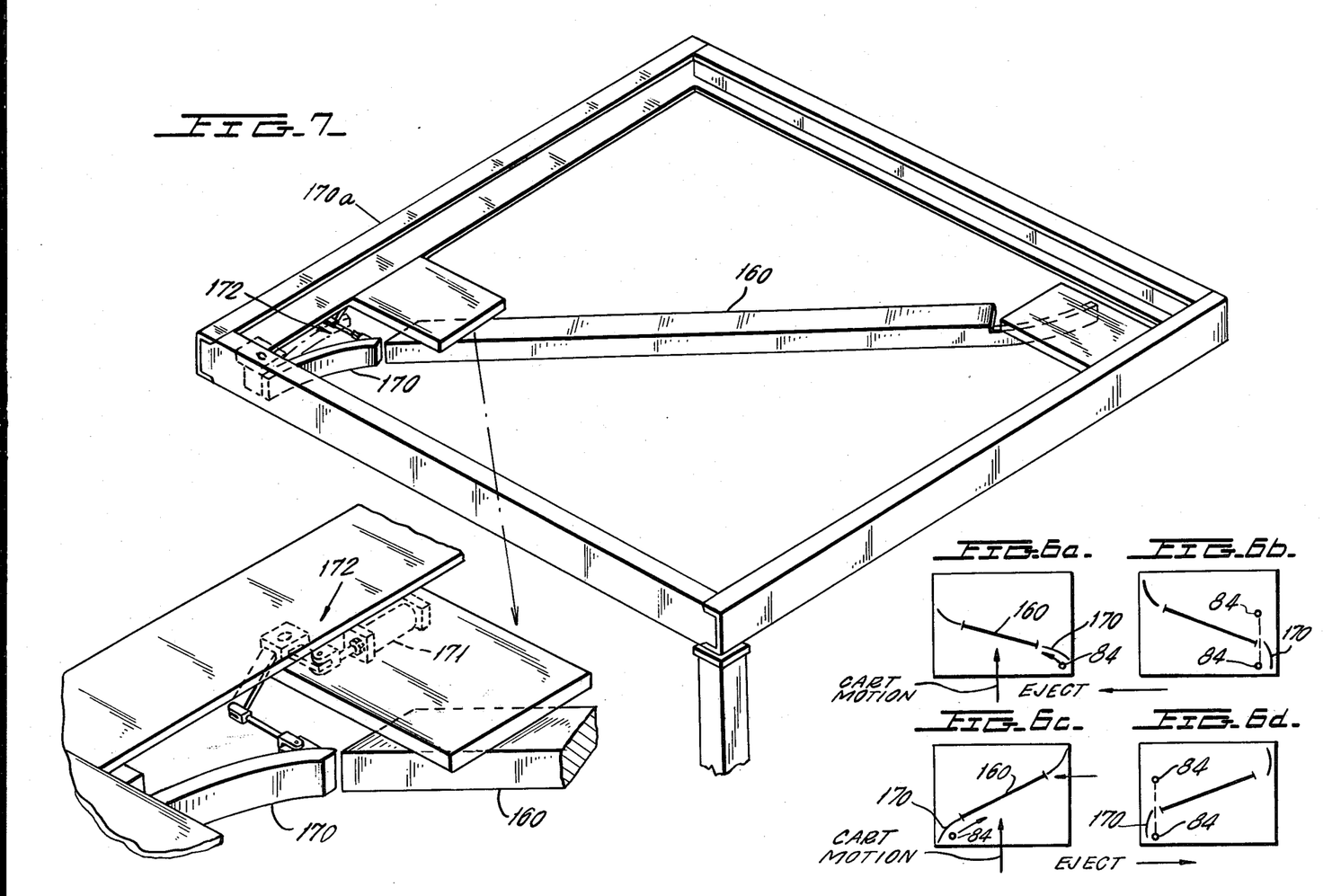
FIGS. 6a to 6d illustrate various configurations of the bundle exit cam for left ejection and right ejection of bundles on the cart.
FIG. 7 is a perspective view of the bundle exit device showing some detail of the cam surface control arrangement.
Figure 8:
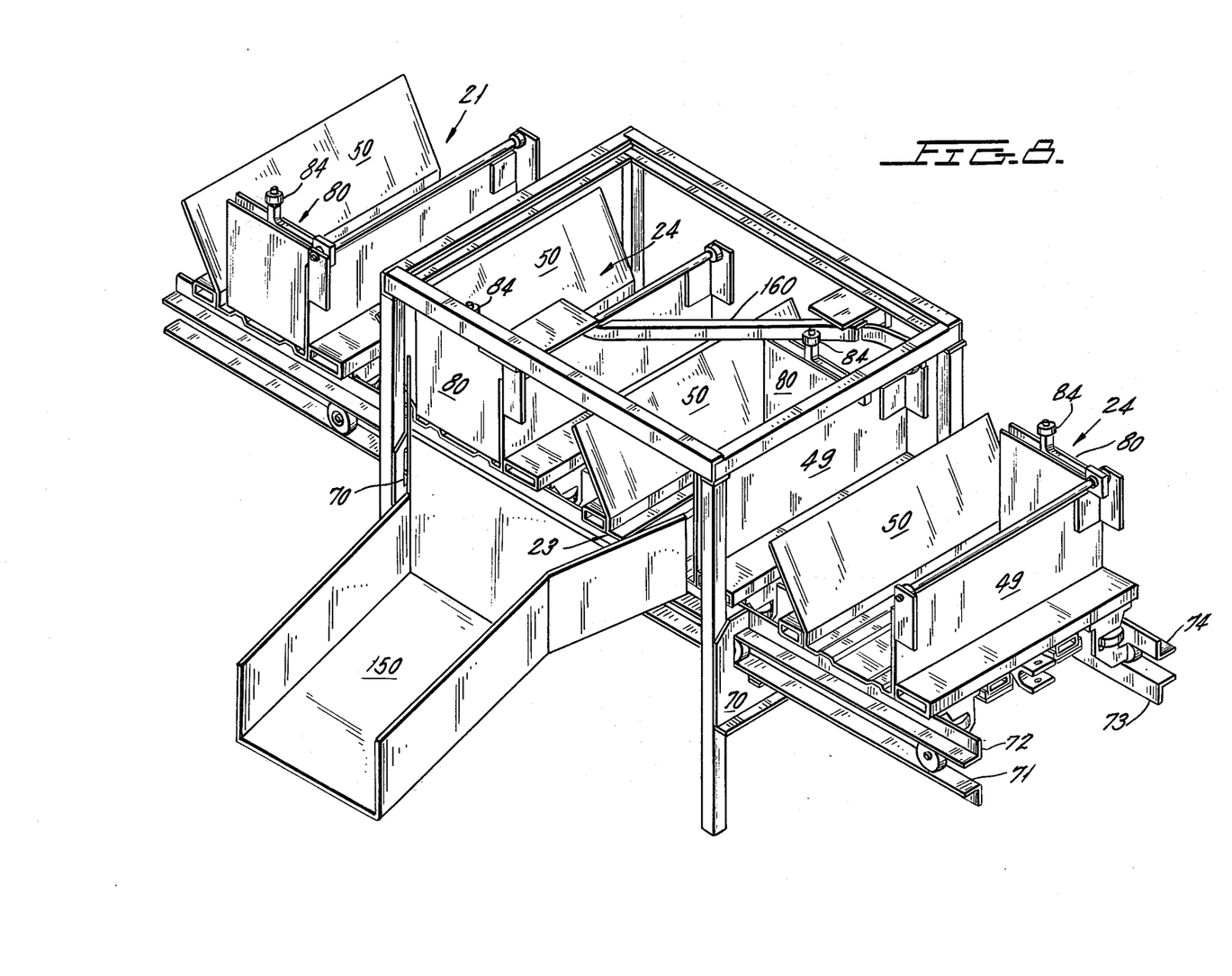
FIG. 8 is a perspective view of the bundle exit device, with track in place, and a cart train passing through the bundle exit device.

The carts, as then shown in FIG. 1, circulate around the closed conveyor system and are brought to a bundle exit device, such as bundle exit devices 40 and 41, where the bundle exit device is typically shown in FIGS. 7 and 8, and wherein the bundle exit device is operable to catch the cam follower 84 of each cart to cause the cam follower to move the pusher plate 80 in the required direction to eject bundles or newspaper stacks in the cart toward a discharge chute, such as discharge chute 150, which leads to a loading station at the loading dock.

In general, the bundle exit device is supported by suitable channel frame supports and carries an elongated cam member, shown as cam member 160 in FIGS. 6a to 6d, 7 and 8, which has a leading surface which will pick up the cam wheel 84 of any cart passing by the exit station. FIG. 8 shows the carts 21 to 24 at the exit station. In FIG. 8, the cart 21 has already passed through the exit station and its pusher plate 80 has been moved from right to left to eject any bundles in cart 21 to the chute 150. The cart 23 is at a camming position in FIG. 8, and its plate 80 is being moved to the left. Cart 24 in FIG. 8 has not yet moved into the exit station, and its pusher plate 80 is at the extreme right.

FIG. 8 illustrates discharge of the bundles from right to left. In illustrating the entry device in FIG. 5, the carts under the bundle entry device are illustrated for a system where bundle discharge is to be from right to left. If the exit station of FIG. 8 is to be used with the carts shown with the entry device of FIG. 5, the plates 80 of FIG. 5 would be at the right-hand side of the tracks and would be pushed to the left as they come through the exit station in FIG. 8. Moreover, they would then be reset to the right-hand position after passing through the exit station of FIG. 8.

The cam track 160 shown in FIGS. 6 and 7 is rigidly held beneath the upper frame and can be mounted in a diagonally opposite direction from that of the figures if the bundle discharge is to be from right to left. As best shown in FIG. 7, the end of the cam 160 flows into a movable cam portion 170 which can be operated by an air cylinder 171 through a linkage 172.

The operation of air cylinder 171 is controlled by suitable system controls. If bundles are to be discharged at the exit station, the air cylinder 171 is actuated in such a manner that the movable cam portion 170 is positioned as shown in FIG. 7, thus permitting the cam follower 84 to engage the cam and move the pusher plate 80 from one side to the other side of the cart. If bundles are not to be discharged at the exit station, the air cylinder 171 is actuated such that the movable cam portion 170 is opened and positioned parallel to the structure 170a and the path of travel of the cart, thus allowing cam follower 84 to pass through the opening created between structure member 170a and cam 160, and the pusher plate remains in position.

FIGS. 6a and 6b schematically illustrate the cam 160 arranged for ejection to the left of the cart as the cart moves forward when the cam section 170 is in position (FIG. 6a) and is open (FIG. 6b). The same structure can be used for ejection to the right, as shown in FIGS. 6c and 6d by placing gate 170 on the opposite end of cam 160.

FIG. 8 illustrates the support of the rails 71 to 74 which are carried in support plates 70 which are mounted on the exit station frame. FIG. 8 also illustrates the movement of carts 21 to 24 into and past the exit station, and illustrates the pusher plate 80 of cart 23 as it begins to move from right to left in order to eject any bundles which may be carried by the cart 23 into the chute 150. Note that the ejection process begins just before the end wall 49 of cart 23 has cleared the wall of chute 150.

A cart conveyor system using the carts and the exit and entry devices described herein may have an individual cart length of 30 inches and a cart velocity of about 250 feet per minute. The cart train has a minimum horizontal turn radius of 6 feet and a vertical minimum turn radius of 10 feet. The system is capable of operating with incline and decline angles up to 45° and has a maximum loading rate of 30 bundles per minute using two bundles per cart, and a maximum transfer rate of 200 bundles per minute.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. A newspaper mailroom conveyor system having means supporting newspaper bundle carrying conveyor carts and means causing them to move in a closed path between bundle loading and discharge stations, conveyor carts, and means defining loading and discharge stations at selected locations around the closed path, the system being characterized by having an improved conveyor cart comprising a bottom platform, a rear wall extending substantially vertically upwardly from said bottom platform, a front wall extending initially vertically upwardly from said bottom wall and then forwardly in a direction forming an acute angle between it and the plane of the bottom platform, pusher plate means defining a side wall substantially closing the space between said front and rear walls, means mounting said pusher plate whereby it can be moved laterally from side to side of said bottom plate, said means for mounting said pusher plate for lateral movement comprises, rollers journaled on the lower end of said pusher plate means for rotation about axes that are oriented normal with respect to each other, the outer surface of one of said rollers riding in contact with the vertical portion of said front wall and the other of said rollers riding in contact against said bottom platform, and guide bar means extending across the transverse width of the conveyor cart and slidably engaged with said pusher plate means to insure smooth transverse movement of said pusher plate means from one side of the bottom platform to the other, means forming a part of said pusher plate means for engaging actuating cam surfaces located at the discharge stations of the conveyor system to move said pusher plate laterally and cause discharge of the newspapers carried in the conveyor cart, and selectively operable cam surfaces located at the discharge station to effect operation of said pusher plate means when desired.

2. A conveyor system as defined in claim 1 wherein said means for engaging actuating cam surfaces at the discharge stations comprises a cam follower that extends upwardly beyond the upper edge of said pusher plate means.

3. A conveyor system as defined in claim 1 wherein said bottom platform includes first and second raised ridges extending across the width thereof.

4. A conveyor system as defined in claim 1 wherein one of said roller rides on one of said raised ridges.

* * * * *